United States Patent
Zaretsky et al.

(10) Patent No.: US 6,462,926 B1
(45) Date of Patent: Oct. 8, 2002

(54) LOW LOSS DIODE-ORING CIRCUIT

(75) Inventors: Boris Zaretsky, Norcross, GA (US); Roger M. Goodner, Norcross, GA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/461,012

(22) Filed: Dec. 15, 1999

(51) Int. Cl.$^7$ ................................................ H02H 5/00
(52) U.S. Cl. ........................ 361/103; 361/58; 361/106
(58) Field of Search ........................... 361/103, 30, 125, 361/127, 91.6, 93.4, 66, 100, 159, 82; 363/65, 71; 307/43

(56) References Cited

U.S. PATENT DOCUMENTS

| | | | | |
|---|---|---|---|---|
| 4,857,985 A | * | 8/1989 | Miller | 357/42 |
| 5,109,162 A | * | 4/1992 | Koch et al. | 307/127 |
| 5,517,379 A | * | 5/1996 | Williams et al. | 361/84 |
| 5,654,858 A | * | 8/1997 | Martin et al. | 361/56 |
| 5,654,859 A | * | 8/1997 | Shi | 361/66 |
| 6,084,790 A | * | 7/2000 | Wong | 363/71 |

OTHER PUBLICATIONS

D. Steinberg. Cooling Techniques for Electronic Equipment; 1991, J. Wiley & Sons, Inc., pp. 64–65.*

* cited by examiner

Primary Examiner—Stephen W. Jackson
Assistant Examiner—Z Kitov

(57) ABSTRACT

A low loss diode ORing circuit has a feed input connected in series with a diode/transistor parallel network and the ouput. Heat is generated by the transistor when the transistor is turned on. A thermally conductive material (such as a heatsink) can dissipate heat and transfer heat from the transistor to the diode. The generated heat is transferred to the diode via the heatsink. As a result of the increased temperature of the diode and the diode's own negative temperature coefficient on conduction voltage, the diode's characteristic conduction threshold is reduced and the diode begins to conduct and share the current load as the current increases, thus providing minimal power dissipation as the current is routed to an output. A comparator may be used to monitor a voltage difference between the voltage level on the feed input and a voltage level on the output. If the difference between the voltage level on the feed input and a voltage level on the output is greater than a predetermined threshold, a problem condition is indicated and the comparator turns off the transistor via a shutdown signal to effectively isolate the feed input.

19 Claims, 2 Drawing Sheets

US 6,462,926 B1

LOW LOSS DIODE-ORING CIRCUIT

DESCRIPTION OF THE INVENTION

1. Field of the Invention

The present invention relates generally to a low loss Diode-ORing circuit, and specifically to a parallel configuration of a diode and a power MOSFET transistor in each diode branch yielding minimum power dissipation and low temperature on the circuit components.

2. Background of the Invention

Redundant system of device power feed is often required when powering MISSION critical equipment. Then two or more power sources must be connected to provide power to the system.

When one of the power sources fails or is removed from the service the other power source is available in a redundant capacity to supply required power to the system without interruption of service. In this situation, it is also important to ensure that disconnected input terminal does not carry potentially dangerous power that can injure service personnel.

Those skilled in the art will be familiar with conventional Diode-ORing circuits providing redundant power to the load. Referring to FIG. 1, a conventional Diode-ORing circuit is commonly used to connect two or more power feed inputs to a single device load. Note that connection of the diodes in FIG. 1 assumes the negative power source as it is commonly used in telecommunication industry. Here and in the rest of this paper the diodes and other devices should be reverse connected if positive power source is used. When one of the power feeds is disconnected, the other feed continues to provide power to the load through its diode. The current would not flow back to the disconnected input due to the diode in the disconnected branch thus isolating that input from the rest of the circuit. The typical Diode-ORing circuit in power application includes two or more diodes each connected in series between an individual power source and common output to the load. Each diode allows current to flow to the load but limits the same current from flowing out of the other feed input. In this manner each input in the circuit is isolated from the other inputs and does not allow generating a potentially dangerous voltage at the disconnected input back fed from the other source(s).

Typically high power Schottky diodes are used in these applications in order to reduce voltage drop across the diodes and, therefore, reduce the power losses. The common problem in this application is still high power dissipation on the Schottky diodes especially when application requires using the diodes with high reverse voltage characteristics. These diodes have relatively higher forward voltage drop characteristics and, therefore, create higher power dissipation. The problem becomes more severe when one input is disconnected and the other should take over to carry full current to the load.

For example, a high power Schottky diode may have forward voltage drop of 0.6 Volts at the load current of 20 Amps each (required load current is 40 Amps) yielding the power dissipation:

$$P=V\times I=0.6\times 20=12 \text{ Watts.} \quad (EQ.1)$$

When only one input conducting full load current the voltage drop across the single Schottky diode may increase to 0.9 Volts yielding the power dissipation of:

$$P=V\times I=0.9\times 40=36 \text{ Watts.} \quad (EQ. 2)$$

The other problem of conventional circuit in FIG. 1 is concentration of heat on single silicon die. When in the example above both diodes are connected and conducting current to the load, each diode actually conducts only half of the current yielding conductive losses of 12 Watts each. Here each silicon die dissipates only 12 Watts. When one power feed is disconnected the other diode provides full power to the load and dissipates 36 Watts concentrated on one silicon die.

Dissipating such a large amount of power is undesirable because it requires a large heatsink that (1) takes up valuable physical space and (2) undesirably increases the cost of the design. Therefore, there is a need to find an inexpensive Diode-ORing circuit with minimal power losses and heat dissipation.

A simple solution to this problem is merely to select an overrated diode that has yet lower forward voltage drop and higher forward current. This solution reduces the requirements for such a large heatsink, but drive up the cost of the design since the diodes of such characteristics, especially of high reverse voltage, typically very expensive. Given the increased cost of the diodes, it is often unfeasible to competitively implement it in many circuit designs.

Another possible solution is to use a power MOSFET transistor instead of the diode in the Diode-ORing circuit. The equivalent drain-to-source resistance of the transistor, commonly known as $R_{dson}$, can be low enough that the power dissipation is improved comparing to the conventional Diode-ORing circuit. In the above example when current is 20 Amps and $R_{dson}$ is 0.025 Ohms the Power Dissipation is:

$$P=I^2\times R=20^2\times 0.025=10 \text{ Watts.} \quad (EQ. 3)$$

However, as the current increases the power dissipation increases proportionally to the square of the current value. Therefore, while using a transistor instead of the diode at lower current is beneficial, the dissipated power can be much higher when one of the inputs is disconnected and the transistor is forced to provide double the load current:

$$P=I^2\times R=40^2\times 0.025=40 \text{ Watts.} \quad (EQ. 4)$$

Further to exacerbate the problem, the $R_{dson}$ of the transistor has positive thermal coefficient. It's value increases with increase of the die temperature that can cause a thermal run-away and eventual destruction of the transistor. To avoid this problem the transistors would have to be placed on even larger heatsink and use of more costly devices would be necessary.

In light of the foregoing, a need exists for a circuit that adequately provides redundant power to the load while minimizing the amount of power losses.

SUMMARY OF THE INVENTION

Accordingly this invention is directed to a low loss diode-oring circuit and method of providing redundant power feed to the load with minimal power losses that substantially obviates one or more of the limitations and disadvantages of the described prior arrangements.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

To achieve these and other objects and advantages, and in accordance with the purpose of the invention as embodied and broadly described herein, a low loss diode-oring circuit consistent with the present invention has:

two or more input feeds (two input feeds are described herein, however, the number of input feeds is not limited in this invention);

a parallel combination of diode, such as a low forward voltage drop diode (such as Schottky diode), and a transistor, such as a low $R_{dson}$ power MOSFET transistor, in each input branch connected in between each input feed and the output; and each parallel network of diode transistor combination is placed on the same heatsink, to facilitate heat transfer from transistor to diode and vise versa. Typically, the diode has negative thermal coefficient. That is when the heat dissipated in the transistor indirectly heats the diode. The diode's forward voltage threshold reduces due to a negative thermal coefficient and the diode begins to conduct earlier in its characteristics. The opposites are true for a MOSFET transistor. Typically it has positive thermal characteristics. $R_{dson}$ of the transistor would increase with increase of its temperature thus increasing voltage drop across transistor at the same given current and further increasing power dissipation and temperature. This phenomenon may cause a thermal ran-away of the transistor and eventual destruction of the silicon die. The diode connected in parallel with the transistor will begin to conduct "earlier" in its characteristics due to the negative thermal coefficient described above. Thus, the diode "takes over" some current from the transistor "relieving" it from excessive load current further providing thermally balanced coupling of the diode-transistor network.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

Reference will now be made in detail to the present preferred embodiments of the invention, examples of which are illustrated in the accompanying drawings. Whenever possible, the same reference numbers will be used throughout the drawings to refer to the same or like parts.

In FIG. 2, CB1, CB2 are feed protection circuit breakers installed on a power distribution frame or panel at the power source. D1 and D2 are diodes, preferably Power Schottky diodes. Q1, Q2 typically are Power MOSFET transistors.

Note that the number of diode-transistor branches is virtually limited only by number of power feeders in a given application. Hence, this circuit would allow multiple branches to share the current flow to the load thus further reducing overall power dissipation and associated heat over the diode-oring circuit.

Figure 1:
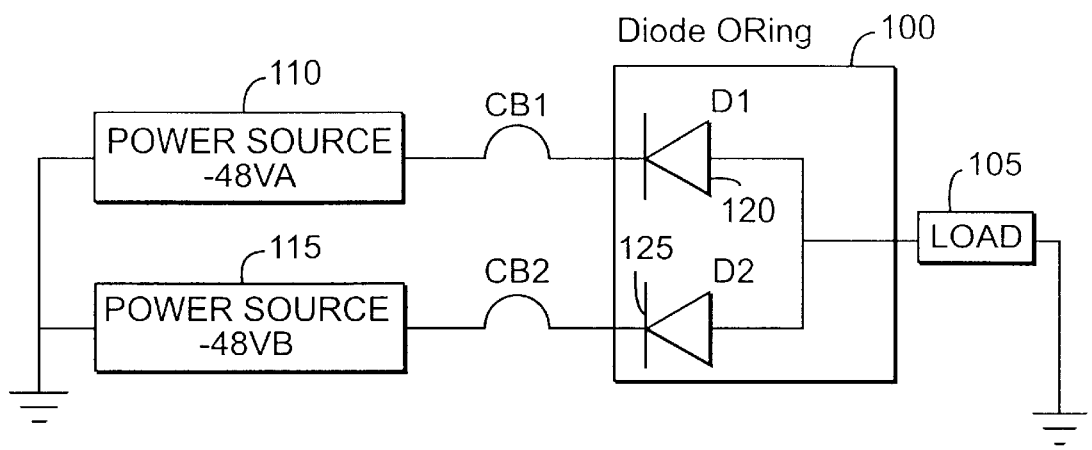
FIG. 1 is a block diagram of a prior art diode-oring circuit presently used in the industry.

Comparing with conventional diode-oring in FIG. 1 where the voltage drop is set by the properties of the diode used in the circuit. Here the voltage drop would not change by paralleling multiple diode networks. The heat dissipation becomes a function of the load and of that predetermined by the specification diode voltage drop. Therefore the heat dissipation will change proportionally to the load current.

The MOSFET transistors are bi-directional devices due to their principle design. That is, if a transistor is set to conduct, the current may flow in either direction. That may cause a potentially hazardous condition at the disconnected or shorted to ground input.

In the case of disconnected input the voltage at this input appears almost equal to the output voltage propagated from the other connected input. This voltage is considered hazardous if it exceeds 32 Vdc.

In the case when the input accidentally shorted to ground the current will flow to the ground from the other normally connected input thus bringing entire system down.

The conclusion is that if a MOSFET transistor is used in parallel with the diode that transistor should be turned off if any abnormality, such as open or short circuit at the input, occurs in order to avoid a hazardous condition.

Figure 2:
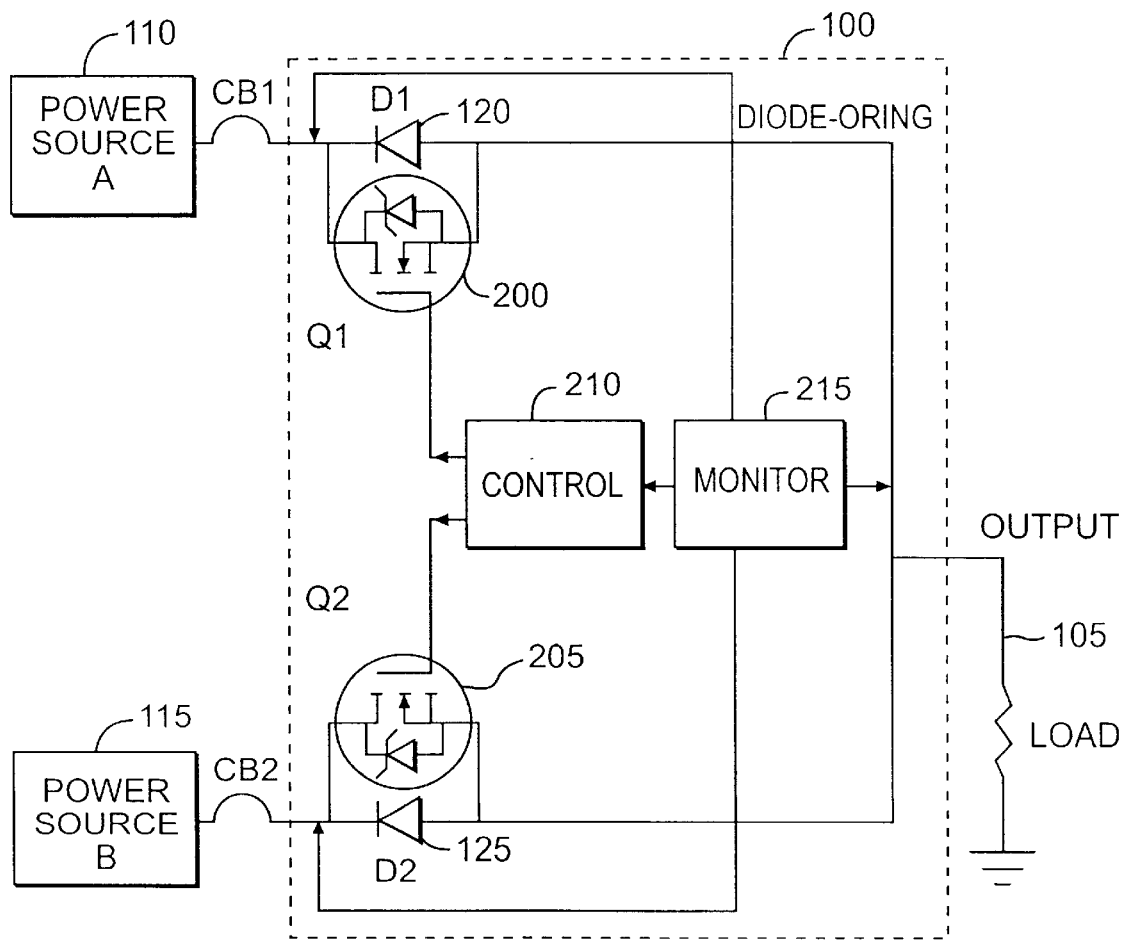
FIG. 2 is a more detailed block diagram illustrating an exemplary Diode-Oring circuit consistent with embodiment of the present invention.

For this purpose a monitor and control circuit are used as shown in FIG. 2.

In one embodiment of the present invention, the monitor and control circuit is based on a single comparator gate for each diode branch. In the case of telecommunication power principles where a power source provides negative potential to the load the positive terminal of the comparator is connected to the output via a resistor. The comparator itself is referenced to the output. It means that the negative power terminal (Vee) of the comparator is connected to the output of the Diode-Oring circuit and the positive power terminal (Vcc) is connected to a power source of approximately 12 to 15 Volts referenced to the Diode-Oring output. The negative input terminal of the comparator is connected to the input of the corresponding diode branch via a resistor of higher value. The difference between output and input voltages is detected by monitoring both using a comparator. This embodiment is illustrated in more detail in FIG. 3.

Case of Normal Operation

If an input feed is connected and its input voltage is higher in absolute value than the output voltage it is said that the conditions for operation are normal and the comparator turns on the MOSFET transistor allowing the current flow through. In the state of normal operation the input voltage is higher than the output (and in the present case for telecommunication circuit, the input is more negative than the output) due to the voltage drop across the parallel diode—transistor network developed by the passing through current.

Case of Shorted to Ground Input

If the short circuit occurs at the input, the input voltage will be lower in absolute value (or in our case more positive) than the output (the output still gets power from the other, not shorted to ground, input). This condition is said to be abnormal and the comparator shunts the gate-to-source junction, thus turning off the MOSFET transistor of the shorted to ground input. The Schottky and transistor body diodes will not conduct since they both are set reverse-biased in this condition. Therefore, the input shorted to the ground is disconnected preventing the current back-flow from the other input.

Case of Disconnected Input

The high value resistors between input terminal and the ground allows low voltage to develop across the disconnected input due to a small leakage current of the circuit and reverse leakage current of the Schottky diode. This voltage is set to be lower in absolute value (or more positive in our case of telecommunication powering scheme) than the output voltage. The resultant effect is the same as in the case above; i.e. the comparator shunts or otherwise disables the gate-to-source junction turning the MOSFET transistor off. This will prevent the current back-flow from the connected input to the disconnected one and prevent the development of high hazardous voltage at the disconnected input.

Since the comparator output shuts down the transistor due to open or short circuit at the diode branch input that comparator output signal may serve as an alarm to indicate abnormalities at the diode branch input. However a separate input monitor circuit may prove to be more advantageous since one of the transistor in Diode-Oring circuit may be turned off simply due to overly low current yet allowing the load to operate without a problem due to current flow through the other diode branch. This situation may occur when the input voltage potential is different between source A and source B and/or the voltage drop across feeder A is different than that across feeder B.

Figure 3:
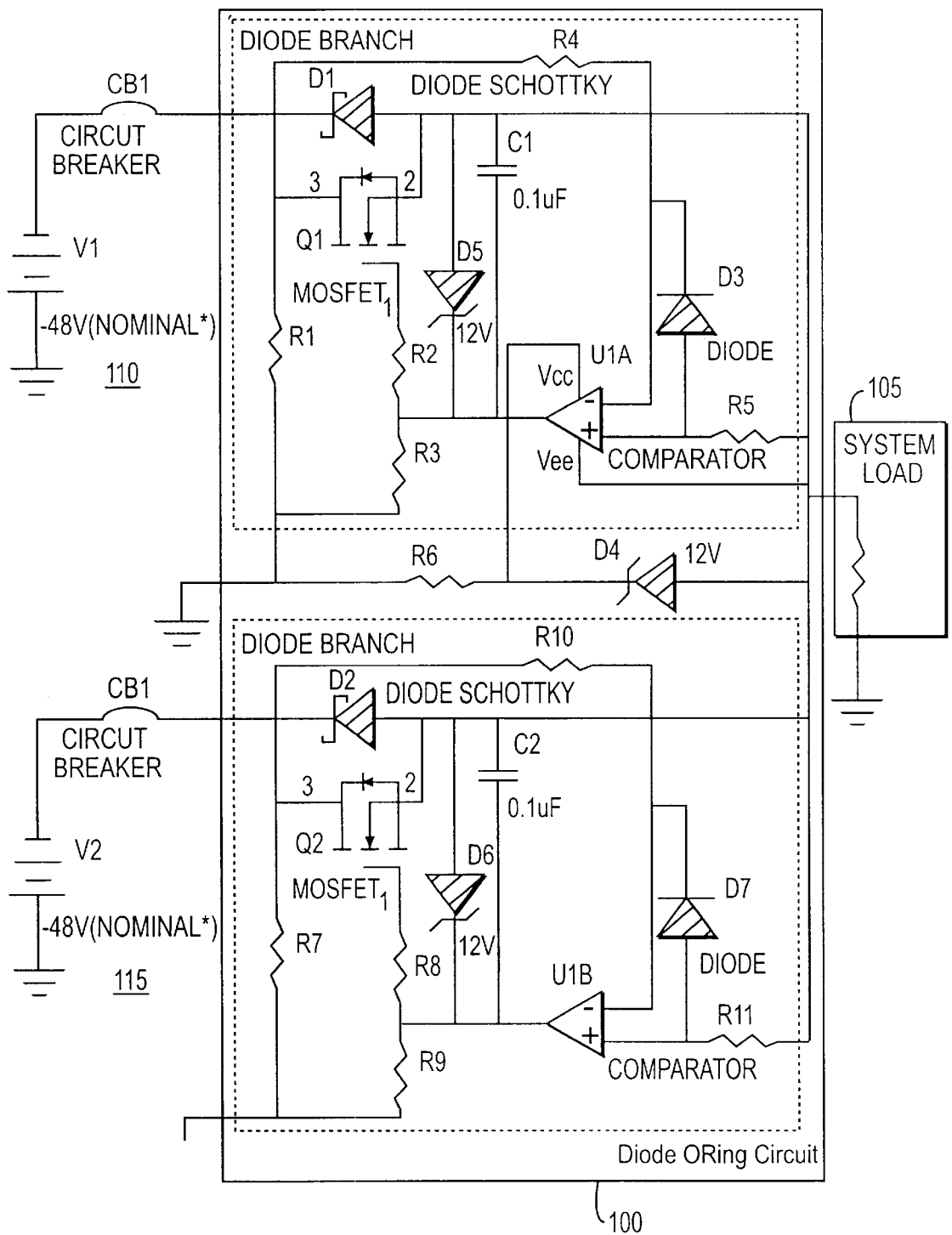
FIG. 3 is a schematic exemplary diagram illustrating the multi-branched Diode-Oring circuit with single transistor in each branch and monitor and control circuits consistent with embodiment of the present invention.

Referring now to FIG. 3, the operation of a multi-branched diode-Oring circuit is described. First when power is applied to any one diode branch in the circuit the output voltage will be set equal to the input source voltage V1 (or V2) minus the voltage drop across the diode D1 (or D5) in the diode branch circuit. For example:

$$V_{out} = V_1 - V_d = 50V - 0.6V = 49.4V \qquad (EQ. 5)$$

Where the source voltage $V_1$ is assumed equal to 50V and voltage drop $V_d$ across the diode is assumed equal to 0.6V.

This will allow to power control circuit comparators from the voltage source developed across Zener diode D4. Now the input voltage is monitored and compared to the output voltage. The input voltage in Diode Branch 1 is sensed by negative terminal of the comparator via resistor R4. The output voltage is sensed by the positive terminal of the comparator via resistor R5. Similar process occurs in Diode Branch 2 where the input is sensed by negative terminal of the comparator via resistor R10 and the output is sensed by positive terminal of the comparator via resistor R11.

The circuit uses comparators with embedded open collector transistor output. If the voltage at the positive terminal is higher than the voltage at the negative terminal, the comparator output transistor is turned off allowing the voltage to develop across Zener diode D5 via resistor R3 thus, turning on the MOSFET transistor. If the voltage at the positive terminal is less than the voltage at the negative terminal the output open collector transistor is turned on sinking the current from R3. This will shunt Zener diode to the reference point Vee of the comparator that is the same point where the anode of Zener diode is connected, i.e. output voltage of the circuit. In effect, this will turn off the MOSFET transistor.

Initially the input voltage V1 is more negative than the output voltage Vout due to the voltage drop across the diode D1. Therefore, the open collector transistor inside the comparator is turned off. The bias voltage develops across Zener D5 and MOSFET transistor Q1 is turned on conducting the current to the load. The voltage drop across MOSFET reduces overall voltage drop across diode branch due to low $R_{dson}$ of the MOSFET reducing overall power dissipation across the diode branch. The voltage drop across MOSFET reaches finite value continuously supporting the voltage difference between input and output of the circuit thus continuously supporting the on-state of the MOSFET transistor.

If the input power feeder (V1) is removed or circuit breaker CB1 is turned off the output voltage will be supplied through the other diode branch and practically only depend on the value of source V2. The input voltage at the disconnected branch will be that developed across R1 through the resistor-divider network R5-D3-R4-R1. The voltage sensed across R1 becomes more positive than the output voltage monitored by the positive terminal of the comparator. Therefore the open collector transistor inside comparator is turned on shunting Zener diode D5 and, thus, removing the bias voltage from the gate of the MOSFET. The MOSFET is turned off and this diode branch stops conducting. The voltage at the input of the diode branch depends on selection of resistive divider network components R5, R4, and R1. These resistors can and should be selected to prevent hazardous voltage development at the input due to the current through divider and leakage current through Schottky diode D1.

The diode D3 across the inputs of the comparator serves to protect the inputs when the voltage difference between the output of the circuit and its input exceeds specified safety margins of the comparator. This is especially important when the input is shorted to ground.

If the input of the diode branch is shorted to ground the voltage at the negative input of the comparator is more positive than the voltage at the positive input of the comparator. This difference is limited by the protection diode D3, thus saving the comparator from failure. The open collector transistor inside the comparator shunts Zener diode D5 and turns off the MOSFET transistor stopping it from conducting the current to the load. Those skilled in the art will appreciate that a similar operation occurs in diode branch 2.

In addition the input status of the circuit can be monitored and an alarm signal may be set when the input is either disconnected or shorted to ground. The principle operations of alarm may be to monitor the voltage of the said input and set an alarm signal to indicate the problem Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A low loss diode ORing circuit, comprising:
    a feed input capable of receiving a power signal;
    a parallel combination of a diode and a transistor, which is electrically connected in series with the feed input, wherein the parallel combination dissipates a low amount of power as the power signal propagates through the parallel combination, and wherein the parallel combination is operative to isolate the feed input when a problem occurs at the feed input; and
    an output for providing the power signal from the parallel combination to a different circuit.

2. The low loss diode ORing circuit of claim 1, wherein the parallel combination further comprises:
    the diode connected in series with the feed input;
    the transistor having a drain and a source connected in parallel with the diode; and
    a thermally conductive material between the diode and the transistor capable of transferring heat from the transistor to the diode.

3. The low loss diode ORing circuit of claim 2, wherein the diode has a characteristic conduction threshold which is reduced by the heat transferred from the transistor to the diode.

4. The low loss diode ORing circuit of claim 2, wherein the transistor is a power MOSFET device.

5. The low loss diode ORing circuit of claim 1, further comprising a monitoring circuit that compares a voltage level of the feed input to a voltage level of the output and turns off the transistor if there is a significant difference between the voltage level of the feed input and the voltage level of the output.

6. The low loss diode ORing circuit of claim 5, wherein the monitoring circuit further comprises a comparator having a first input and a second input, the first input being connected to the feed input and the second input being connected to the output, wherein the comparator is operative to provide a shutdown signal to the transistor to isolate the feed input if a voltage level of the first input and a voltage level of the second input are greater than a predetermined threshold voltage apart indicating a problem condition with the feed input.

7. A low loss diode ORing circuit, comprising:

a feed input capable of receiving a power signal;

a diode connected in series with the feed input;

a power transistor having a drain-source path connected in parallel with the diode;

a heatsink in physical proximity to the diode and the power transistor, the heatsink being capable of transferring heat generated by the power transistor to the diode;

an output for providing the power signal to a different circuit; and a comparator for monitoring a voltage level on the feed input and a voltage level on the output and capable of turning off the power transistor to isolate the feed input if a difference between the voltage level on the feed input and the voltage level on the output is greater than a predetermined threshold.

8. The low loss diode ORing circuit of claim 7, wherein the diode has a characteristic voltage conduction threshold which is reduced by the heat transferred from the power transistor to the diode.

9. The low loss diode ORing circuit of claim 7, wherein the power transistor is a power MOSFET device.

10. The low loss diode ORing of claim 7, wherein the comparator is operative to provide a shutdown signal to the power transistor that isolates the feed input if the difference between the voltage level on the feed input and the voltage level on the output are greater than a predetermined threshold indicating a problem condition with the feed input.

11. The low loss diode ORing of claim 10, wherein the comparator is further operative to provide the shutdown signal as an alarm signal to a monitor circuit if the difference between the voltage level on the feed input and the voltage level on the output are greater than the predetermined threshold.

12. A low loss diode ORing circuit, comprising:

a first feed input capable of receiving a first power signal;

a second feed input capable of receiving a second power signal;

an output for providing the first power signal and the second power signal to a different circuit;

a first diode-transistor pair connected between the first feed input and the output, wherein the first diode-transistor pair dissipates a first amount of power as the first power signal propagates through the first diode-transistor pair and is operative to isolate the first feed input from the second power signal;

a second diode-transistor pair connected between the second feed input and the output, wherein the second diode-transistor pair dissipates a second amount of power as the second power signal propagates through the second diode-transistor pair and is operative to isolate the second feed input from the first power signal;

a monitoring circuit having a plurality of inputs connected to the first feed input, the second feed input, and the output, the monitoring circuit also being connected to the first diode-transmitter pair and the second diode-transmitter pair; and the monitoring circuit being operative to sense a voltage level on the first feed input, the second feed input, and the output, determine a first voltage difference between the first feed input and the output, determine a second voltage difference between the second feed input and the output, provide a first shutdown signal to the first diode-transmitter pair if the first voltage difference is greater than a first threshold, and provide a second shutdown signal to the second diode-transmitter pair if the second voltage difference is greater than a second threshold.

13. The low loss diode ORing circuit of claim 12, wherein each of the diode-transistor pairs includes a Schottky diode configured in parallel with a MOSFET transistor, the Schottky diode having a characteristic conduction threshold which is reduced by heat transferred from the MOSFET transistor to the isolation diode.

14. The low loss diode ORing circuit of claim 13, wherein each of the diode-transistor pairs further includes a heatsink in contact with the Schottky diode and the MOSFET transistor, the heatsink being capable of transferring heat generated by the MOSFET transistor to the Schottky diode.

15. The low loss diode ORing circuit of claim 12, wherein the monitoring circuit further comprises a first comparator for generating the first shutdown signal in response to the first voltage difference and a second comparator for generating the second shutdown signal in response to the second voltage difference.

16. The low loss diode Oring circuit of claim 15, wherein the monitoring circuit is further operative to provide the first shutdown signal and the second as an alarm signal.

17. A method providing with minimal power dissipation, comprising the steps of:

providing a power signal to a parallel combination of a diode and a transistor through the feed input;

generating heat by the transistor as the transistor conducts the power signal through a drain-source path of the transistor;

transferring a portion of the generated heat from the transistor to the diode;

reducing a voltage drop threshold associated with the diode in response to the portion of the generated heat in order to provide the minimal power dissipation; and turning off the transistor to isolate the feed input if a voltage difference across the drain-source path of the transistor is above a predetermined threshold.

18. The method of claim 17, wherein the transferring step further comprises transferring the portion of the generated heat using a thermally conductive material between the transistor and the diode.

19. The method of claim 18, wherein the transferring step further comprises transferring the portion of the generated heat using a heatsink conductively attached to the transistor and the diode.

* * * * *